United States Patent
Brauner et al.

(10) Patent No.: US 8,456,283 B2
(45) Date of Patent: Jun. 4, 2013

(54) DEVICE AND METHOD FOR SUPPRESSING A TRANSMITTED SIGNAL IN A RECEIVER OF AN RFID WRITING/READING DEVICE

(75) Inventors: Thomas Martin Brauner, Zurich (CH); Roland Küng, Wolfhausen (CH)

(73) Assignee: Intermec IP Corp., Everett, WA (US)

( * ) Notice: Subject to any disclaimer, the term of this patent is extended or adjusted under 35 U.S.C. 154(b) by 943 days.

(21) Appl. No.: 12/511,051

(22) Filed: Jul. 28, 2009

(65) Prior Publication Data

US 2010/0277289 A1    Nov. 4, 2010

Related U.S. Application Data

(63) Continuation of application No. PCT/CH2007/000124, filed on Mar. 8, 2007.

(30) Foreign Application Priority Data

Jan. 29, 2007   (CH) ........................................ 146/07

(51) Int. Cl.
*H04Q 5/22*    (2006.01)

(52) U.S. Cl.
USPC ........ 340/10.51; 340/10.1; 343/819; 370/278

(58) Field of Classification Search
USPC ...................................................... 340/10.51
See application file for complete search history.

(56) References Cited

U.S. PATENT DOCUMENTS

| | | | |
|---|---|---|---|
| 5,691,978 A | 11/1997 | Kenworthy | |
| 6,229,992 B1 * | 5/2001 | McGeehan et al. | ............. 455/78 |
| 2002/0180568 A1 * | 12/2002 | Atokawa et al. | ............... 333/202 |
| 2004/0106381 A1 | 6/2004 | Tiller | |
| 2004/0120420 A1 * | 6/2004 | Hongo et al. | ................. 375/297 |
| 2006/0033607 A1 * | 2/2006 | Bellantoni | .................... 340/10.1 |
| 2006/0098765 A1 | 5/2006 | Thomas et al. | |

FOREIGN PATENT DOCUMENTS

| | | |
|---|---|---|
| GB | 1510625 | 5/1978 |
| WO | 2005109500 A | 11/2005 |
| WO | 2006037241 A1 | 4/2006 |

OTHER PUBLICATIONS

International Search Report and Written Opinion for International Application No. PCT/CH07/000124, mailed on Aug. 14, 2007, 5 pages.
Low-Loss Analog Phase Shifter Using Varactor Diodes, A. Megej et al., Microwave & Optical Technology Letters, vol. 19, No. 6, Dec. 20, 1998.

* cited by examiner

*Primary Examiner* — Brian A Zimmerman
*Assistant Examiner* — Omer S Khan
(74) *Attorney, Agent, or Firm* — Perkins Coie LLP

(57) ABSTRACT

A device for operating an RFID writing/reading device with transmitted signal suppression includes the RFID writing/reading device and a reflection modulator. The RFID writing/reading device includes a transmitter, a receiver with a signal processor, a directional coupler with a first, a second, a third and a fourth port, and an antenna. The reflection modulator is connected to the fourth port of the directional coupler. The reflection modulator includes a first setting element and a second setting element. The reflection modulator is configured to reflect a copy of a transmitted signal from the RFID writing/reading device, the amplitude and phase of which copy have been weighted, to the directional coupler. The directional coupler is configured to add the weighted copy of the transmitted signal to a received signal from the antenna in the directional coupler.

20 Claims, 6 Drawing Sheets

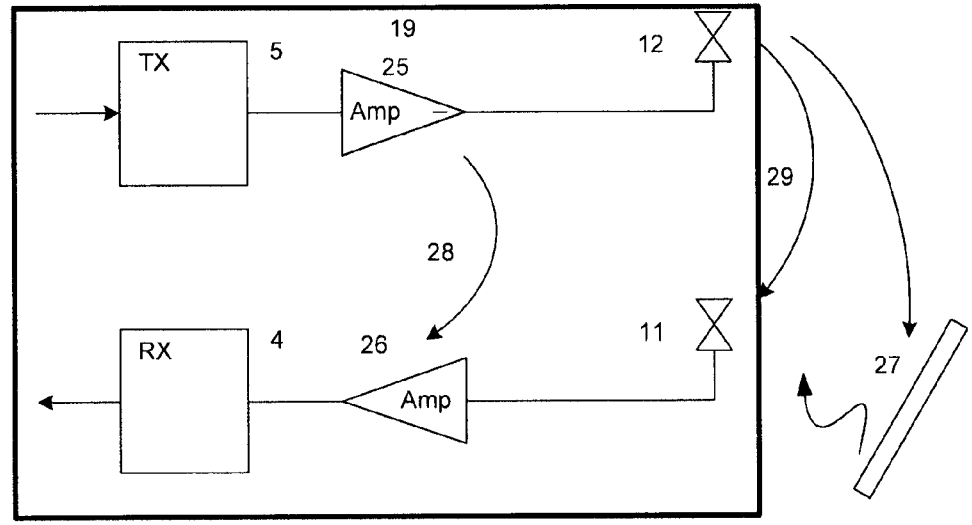
FIG. 1 *(Prior Art)*
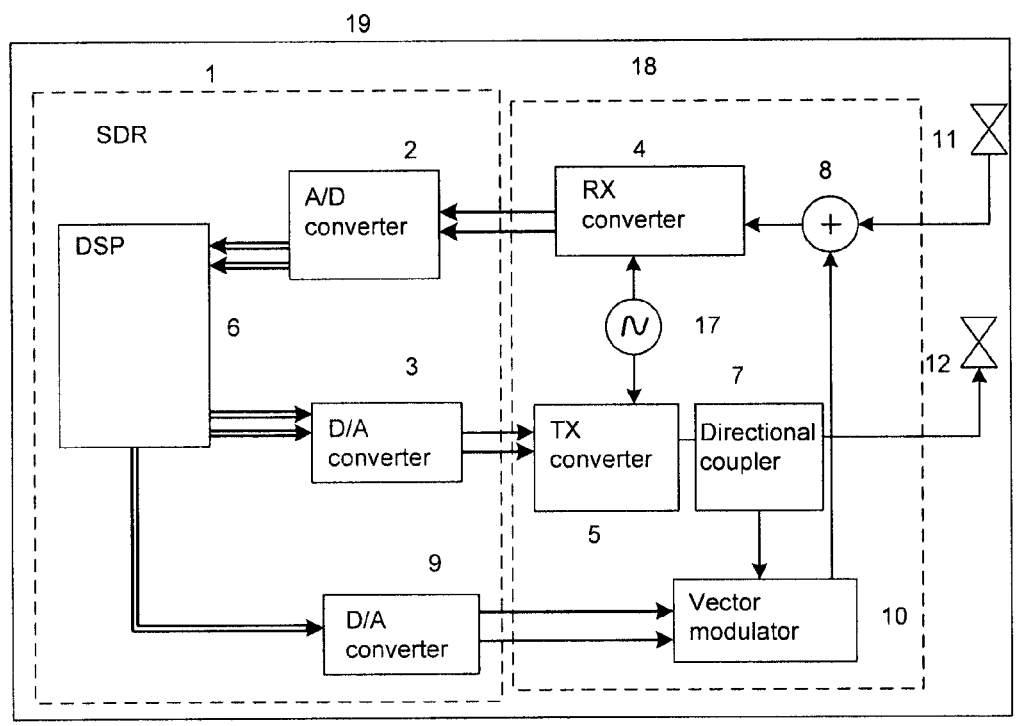
FIG. 2a *(Prior Art)*

US 8,456,283 B2

DEVICE AND METHOD FOR SUPPRESSING A TRANSMITTED SIGNAL IN A RECEIVER OF AN RFID WRITING/READING DEVICE

CROSS-REFERENCE TO RELATED APPLICATIONS

This application is a continuation application of International (PCT) Patent Application No. PCT/CH2007/000124, filed Mar. 8, 2007, and published on Aug. 7, 2008 as International Publication No. WO 2008/092283, the contents of which are incorporated herein by reference, which application claims priority from Switzerland Patent Application No. 00146/07, filed Jan. 29, 2007.

FIELD

The subject matter disclosed herein falls within the field of communication technology. It relates to a device and a method for operating an RFID writing/reading device with transmitted signal suppression, the RFID writing/reading device comprising a transmitter, a receiver with a signal processor, a directional coupler with a first, a second, a third and a fourth port, and an antenna.

BACKGROUND

RFID systems comprise an RFID writing/reading device (reader) and electronic tags. The latter can operate passively, i.e. without a battery, and are therefore reliant on the permanent presence of a carrier signal transmitted by the RFID writing/reading device, also called a power carrier. The carrier signal simultaneously serves as a radio-frequency oscillator for the tag. Although semi-passive tags have a battery, they likewise need a permanently transmitted carrier signal instead of a radio-frequency oscillator for modulation. In this context, RFID systems with ranges of several meters use UHF frequencies or microwave frequencies. The RFID writing/reading device itself comprises a baseband part and a radio-frequency part (RF part) having a transmitter and a receiver.

To achieve reading distances in the region of several meters for passive electronic tags and in the region of several tens of meters for semi-passive electronic tags, a transmitted signal provided by a transmitter TX needs to be produced and emitted at a power of approximately 1 watt (30 dBm). In this case, a significant part of this comparatively powerful transmitted signal is spuriously injected directly into the receiver RX, see FIG. 1, the coupling paths 28, 29 and the reflection at a reflector 27. On the other hand, the receivers in the RFID writing/reading devices must detect the low levels of the response signal which is reflected unamplified from the tags only after modulation of the carrier signal with response data. Such a resultant, requisite wide dynamic range in the receiver in the RFID writing/reading device represents an enormous demand on any bidirectionally operating system. In this case, the RFID writing/reading device can either be operated using a single antenna, with the transmitter and the receiver being decoupled by a circulator, or two directly adjacent antennas are used. In both cases, the isolation between the transmitter and the receiver is known to be low; typically, such isolation is merely around 20 dB.

The transmitted signal injected directly from the transmitter into the receiver is therefore not only very powerful but also unwanted, since it results in intermodulation with the response signal from an electronic tag in the radio-frequency stages of the receiver and hence reduces the sensitivity of the receiver. In other words, the isolation from the transmitter TX to the receiver RX for an RFID writing/reading device is much too low for long ranges in practice in the UHF and microwave band. The isolation is determined by the design of the RFID writing/reading device and particularly by the technology of the circulator at the antenna output or by the arrangement of the transmission and reception antennas used. The use of a circulator can subsequently be handled in the same way as the use of separate antennas. The latter is discussed here as representative of both uses.

A numerical example demonstrates the problem explained above as follows: if the transmitted power is 30 dBm with isolation of 20 dB, this results in a spurious signal of +10 dBm at the receiver input. The useful signal emitted by a passive electronic tag is only just −70 dBm, however, in the UHF band at a distance of approximately 4 m. The high level of +10 dBm for the transmitted signal injected directly into the receiver thus overtaxes the input amplifier of any RFID writing/reading device, which is typically a low-noise small-signal amplifier.

Intermodulation frequencies arise between the injected transmitted signal and the received signal from electronic tags or the signals from other RFID writing/reading devices which are active at the same time. If the received signal is digitized for further evaluation, a dynamic range of 80 dB additionally gives rise to a problem with the available resolution in the case of the 14 to 16 bit analog/digital converters which are usual for this. If the desire is merely to solve the problem by improving the components, the demands on the RF components and the A/D converter become very high and unappealing, particularly as far as linearity and power consumption are concerned. Suppression of or electronic compensation for the injected transmitted signal is thus necessary in order to achieve long ranges.

A known reception architecture therefore provides a so-called direct conversion stage (also called DCS below) in order to move from the radio frequency RF to a baseband. If the data on the electronic tag are modulated and reflected without direct current, the dynamic range for the A/D converter can be moderated by filtering away the DC voltage component DC after down-mixing in the receiver's DCS. In the RF input part of a receiver, however, nothing changes in the intermodulation situation, and electronic compensation is still required. Since removing the DC voltage component eliminates the contribution of the injected transmitted signal in the baseband, said contribution must be detected and processed in an additional circuit. In practice, a maximum received signal with a level of −10 dBm, for example, would be desirable. On the basis of the above calculation, an isolation of at least 20 dB is therefore additionally necessary.

US 2004/0106381 and U.S. Pat. No. 6,229,992 B1 propose measuring the injected signal in the receiver, comprising a reception antenna 11, an addition stage 8, an RX converter 4 and an A/D converter 2 in FIG. 2a, and adding a compensation signal, which is derived directly from the transmitted signal in the RF part, in the reception path shown.

As is known, a reading device 19 comprises a software-defined baseband part 1 (also called SDR below) and an RF part 18, as shown in FIGS. 2a, 2b. In such SDR-based transmission/reception installations, the complex-value signals are conditioned or processed purely by computational means in a signal processor 6 to the extent that they now need merely be shifted by means of linear converters (up converter or down converter) to, or from, the radio-frequency band (RF band). A TX converter 5 in the transmitter is fed a complex baseband signal (inphase and quadrature signal, also called I/Q signal below) which is output by the signal processor 6 via a dual digital/analog (D/A) converter 3. The output signal is forwarded to a transmission antenna 12 via a directional coupler 7. From a reception antenna 11, the received signals are converted into a complex baseband signal (inphase and quadrature signal) by means of an RX converter 4 and are forwarded to a dual A/D converter 2 and accepted by the signal processor 6. In the conventional solution, the transmitted signal is obtained from the output RF signal from the directional coupler 7 and is weighted in the vector modulator 10 with the correction values for phase and amplitude from the DSP 6 using a slow D/A converter 9 and is supplied to the received signal in an addition stage 8 for the purpose of compensation.

In a first step of the reading operation, the received signal is usually digitized and analyzed in a brief Listen Before Talk Phase (LBT phase) of an interrogation cycle over a time interval T0 when the transmitter in a first RFID writing/reading device is turned off. This signal contains the interrogation signals from further RFID writing/reading devices, and it is possible to decide whether or not the transmitter in the first RFID writing/reading device can be turned on. If the first RFID writing/reading device is switched to transmission after the LBT phase, its own receiver must first of all compensate for the injected TX signal in order to achieve a high level of sensitivity.

The compensation signal is obtained from the transmitted signal by adjusting the gain and phase (gain/phase adjuster). This technique is known as adaptive filtering. In this context, the amplitude and phase are adjusted using the so-called vector modulator 10 totally in the RF band. The components for outputting the transmitted signal, for addition in the reception path, and also the vector modulator 10 are RF components, however, which themselves have inaccuracies and features which are not ideal. Immediately effective (instantaneous) reduction of the coupling therefore appears possible only with difficulty and in practice is able to be implemented only iteratively in cycles: measurement/compensation/measurement, etc.

WO 2006037241 uses an architecture with digital signal processing according to FIG. 2b; it is thus possible to compensate for the spurious signal in the receiver by generating a correction signal using a digital signal processor 6, followed by a D/A converter 20 and a linear modulator 14. The linear modulator 14 must operate with very little noise since its noise contribution is not correlated with the transmitted signal to be compensated. The noise of the transmitted signal thus cannot be reduced further with this device and so the carrier signal (cf. 21 in FIG. 3) alone must also be accordingly generated with little noise.

US 2006033607 describes a plurality of devices which are based on directional couplers, are intended to suppress the transmitted signal and comprise at least two directional couplers and one vector modulator for solving the problem. One directional coupler is essentially used to output the transmitted signal and the second is used to add the received signal to the compensation signal from the vector modulator. The principle of compensation using a vector modulator has already been disclosed, in principle, in GB 1510625.

U.S. Pat. No. 5,691,978 proposes combining antenna isolation, analog RF suppression and a digital "echo canceller" in the baseband in order to achieve a high level of isolation. The outlay for this is considerable and makes no sense in economic terms for an RFID writing/reading device.

A common feature of all of these known methods, except for that in WO 2006037241, is that, if a receiver designed on a DCS basis is used, it will be necessary to evaluate a DC voltage signal (DC signal) in order to obtain information about the amplitude and phase of the transmitted signal being injected. However, this DC signal is in turn itself subject to errors as a result of coupling effects on the RF mixers in the RX converter. The same applies to methods which detect crosstalk using a conventional envelope detector. Additional problems arise when other RFID writing/reading devices unintentionally transmit on the same frequency channel at the same time, since their transmission frequencies possibly differ only slightly and thus corrupt each measured value.

For the purpose of measuring suppression, WO 2006037241 proposes generating an auxiliary signal 22 in order to be able to use AC coupling 16 in the receiver 4. This measure prevents overdriving of the low-frequency receiver part as far as the A/D converter and reduces the demand on the dynamic range of the A/D converter. If a transmitted signal from a further interfering RFID writing/reading device is present, it can be argued that calibration cannot be carried out at all under certain circumstances. This problem is solved either by means of the rule for using LBT or by means of synchronization of the entire RFID writing/reading device network.

SUMMARY

It would therefore be advantageous to further develop a device and a method for operating an RFID writing/reading device with transmitted signal suppression such that, in addition to improved transmitted signal suppression, the noise of the transmitter signal is furthermore also concomitantly suppressed and the device is particularly simple and cost-effective. At least one embodiment of the present invention is also intended to be able to be used for an application with an auxiliary signal and is intended to comprise an adapted calibration method.

According to at least one embodiment of the invention, part of a transmitted signal is used in a directional coupler at the antenna output of an RFID writing/reading device such that a copy of the transmitted signal, the amplitude and phase of which copy have been weighted, is reflected into the input of a receiver, which, as a reflected signal, is thus directly subtracted from a spurious coupling signal between the transmitter and the receiver. The degree of reflection and the associated phase are set using a reflection modulator according to at least one embodiment of the invention. In this case, it is advantageous that an auxiliary signal with a frequency offset fd with respect to a carrier signal of the RFID writing/reading device is impressed on the transmitted signal—and thus also on the reflected signal which is, of course, a weighted copy of this transmitted signal—for the purpose of DC-voltage-free processing in the receiver downstream of an RX converter.

In this case, it is particularly advantageous that fewer components than in the known solutions from the prior art need to be provided for this task. The improved attenuation which is achieved in this manner in a cost-effective and space-saving way now also allows, for the first time, the noise component of the transmitted signal to be reduced and the entire reception part to be designed for a definitively reduced dynamic range for the input signal to be expected. Consequently, such dynamic range adjustment makes it possible to achieve increased sensitivity to response signals from electronic tags. This is advantageously associated with reliable detection and processing of such response signals.

The directional coupler used is constructed according to the known prior art. The coupling loss that is inherent in the directional coupler replaces an additional attenuator between the transmitter output and the receiver input in order to achieve first isolation, or replaces the circulator which is often also used. The transmitted power can additionally likewise be determined without a further directional coupler, with the result that a single directional coupler suffices overall to perform all tasks. Furthermore, the device is likewise suitable for using a method with an auxiliary signal in order to achieve virtually immediate compensation for transmitted signal components which have been injected. For this purpose, the reflected signal can be switched off in a first step by means of complete image matching in order to measure the amplitude and phase of the injected signal and provide them in a signal processor for calculating the setting variables for the reflection modulator. After the compensation signal has been switched on, the suppression becomes effective immediately and can be increased further by means of regulatory methods.

In addition, the device according to at least one embodiment of the invention makes it possible to immediately compensate for external reflections or device-internal crosstalk between assemblies in the transmission and reception paths. In one embodiment of the inventive device, overdriving and hence intermodulation in the receiver are prevented by selecting a suitable coupling loss of the directional coupler in order to provide a first weighting for the reflected signal. The directional coupler assumes the simultaneous functions of an attenuator and an addition stage at the receiver input. However, the received signal which is likewise attenuated thereby is still strong enough for passive tags for reliable detection in the RFID writing/reading device.

Another embodiment of the invention makes it possible to compensate for the signals which arrive at the receiver and are produced on account of the transmitted signal being reflected owing to the fact that the antenna of an RFID writing/reading device is not perfectly matched to the reference impedance. As a result of the increased isolation of a directional coupler in comparison with a circulator, the accuracy with which an antenna is matched to the transmitter is often the critical variable which makes up the largest signal component to be compensated for.

The device according to at least one embodiment of the invention likewise makes it possible to measure the transmitted power by setting the reflection modulator to full reflection, with the result that the power output in the directional coupler is reflected to the receiver and part of the transmitted power, which has been scaled at least by the coupling factor, is thus transported to the receiver input and can be measured there. The desired measurement range can be kept scalable by means of an attenuator inserted upstream of the reflection modulator.

It is advantageous that the power reaches the reflection modulator in a fashion reduced by the coupling factor of the directional coupler. The power to be absorbed is thus in the thermally uncritical small-signal range and the shortfall of the transmitted signal on the antenna line, the power of which is intended to be determined, is negligibly small.

Other advantageous embodiments of the inventive device are described below. Since advantages and embodiments of the inventive method may be directly associated with the discussed device, reference is made to the above description and no repetition is given here for reasons of textual economy.

BRIEF DESCRIPTION OF THE DRAWINGS

Embodiments of the invention are explained by way of example below using figures. The same items are fundamentally denoted with the same reference symbols in the figures. In a purely schematic manner, FIG. 1 shows a known architecture of an RFID writing/reading device with a few obvious coupling paths;

FIG. 2a shows a previously used device for compensating for a coupling signal from a transmitter antenna to a receiver antenna;

DESCRIPTION

Figure 4:
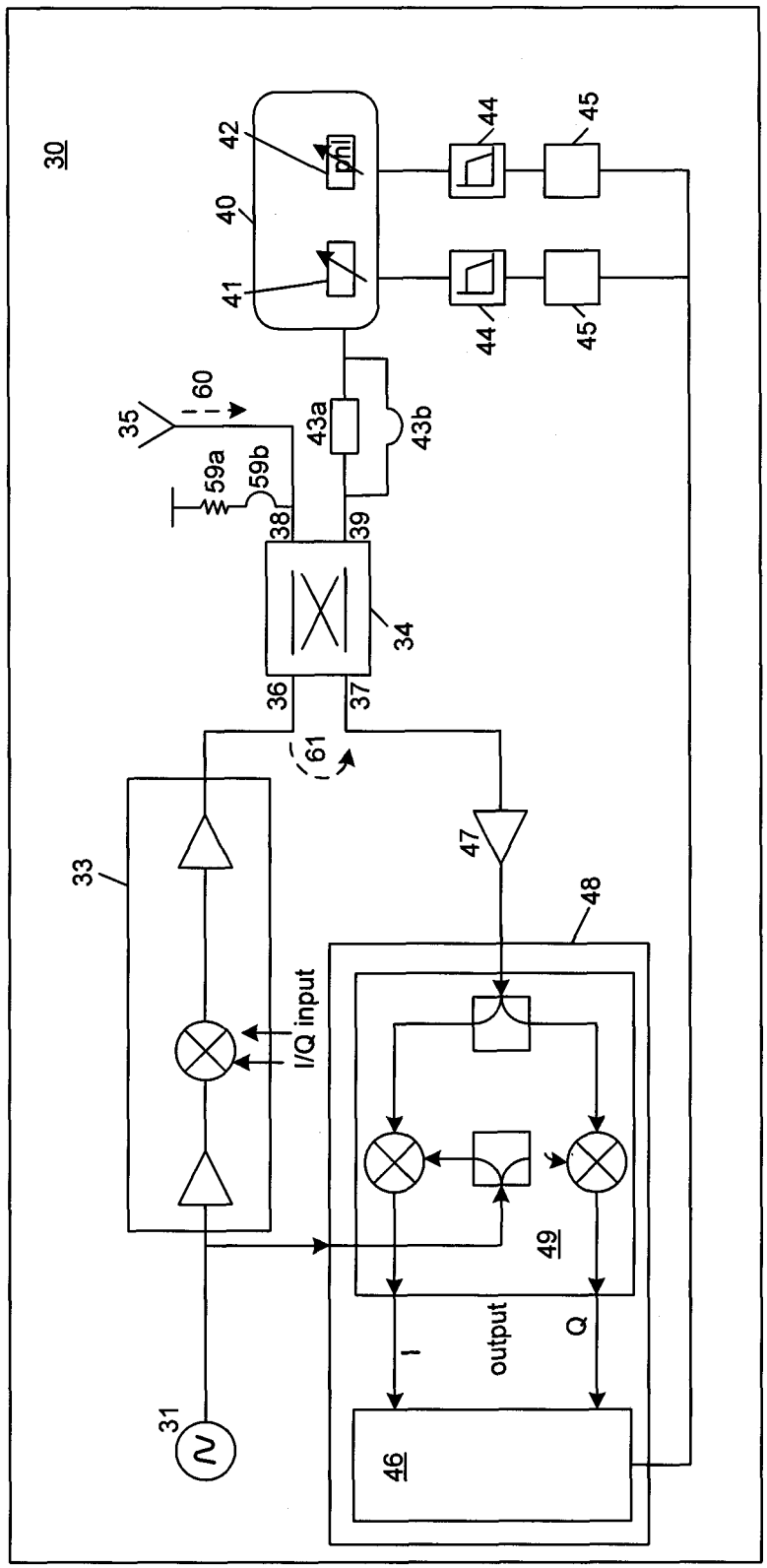
FIG. 4 shows an RFID writing/reading device according to an embodiment of the invention comprising a radio-frequency transmission and reception part with a directional coupler and a reflection modulator.

FIG. 4 shows an embodiment of a novel device and a method for operating an RFID writing/reading device 30 with transmitted signal suppression in order to advantageously compensate for a transmitted signal injected from a transmission assembly 33 into a receiver assembly 48. The transmission assembly 33 is separated from the reception assembly 48 at a first port 36 and a second port 37 by a directional coupler 34. The transmission/reception antenna 35 is connected to a third port 38 of the directional coupler 34 and a reflection modulator 40 is connected to a fourth port 39. An RF oscillator 31, in particular a fixed-frequency oscillator, is used for frequency conversion. The directional coupler 34 respectively has as little attenuation as possible between the first port 36 and the third port 38 and between the second port 37 and the fourth port 39 and has a defined coupling loss of 20 dB, for example, between the first port 36 and the fourth port 39 and between the third port 38 and the second port 37, respectively. Between the first and second ports 36 and 37 and between the third and fourth ports 38 and 39, the directional coupler 34 has isolation of typically 40 dB which determines the crosstalk. In this device, a received signal from the antenna 35 is thus reduced by the coupling loss. However, this is not a hindrance in the case of RFID writing/reading devices for passive tags since the delimitation of the writing/reading distance results from the transmitted signal power which can be obtained from the tags and the received signal at the antenna has sufficient reserve in the level. It should also be taken into account that, as a result of each antenna which is not perfectly matched, part of the transmitted power is reflected and, at the third port 38 of the directional coupler, is passed to the receiver in exactly the same manner as the desired received signal. In addition to the desired signal, the reception part therefore has to process at least one crosstalk signal from the first port 36 to the second port 37 and the transmitted signal reflected from the third port 38 to the second port 37. Since the two signals originate from the same transmitted signal, it is not necessary to distinguish the origin of the two spurious terms; they are added vectorially to form a single signal term which needs to be compensated for. This fact likewise applies to modulated signals as long as the RF frequency is only very much greater than the modulation bandwidth.

A reception amplifier 47 is located upstream of the reception assembly 48, the reception assembly 48 for its part essentially comprising a reception converter (in this case an RX converter 49 with an inphase output (I) and a quadrature output (Q)) and a signal processor 46. For the sake of clarity, it is assumed that other amplifiers and filters are located in the RX converter 49 and the A/D converters (which are likewise not shown here) are located in the signal processor 46.

An attenuator which can be switched off or a fixed attenuator 43a which serves the purpose of adapting the signal level incident in the reflection modulator 40 is connected to the fourth port 39 of the directional coupler 34.

For the sake of better understanding, reference is made to the wave theory of radio-frequency signals, according to which an outgoing wave and a returning wave are formed on each line with a characteristic impedance Zo (50 ohms in this case), depending on the terminating impedance ZL. The reflection modulator 40 comprises two setting elements 41 and 42, with the aid of which the phase and amplitude of the wave incident at the input are made alterable for the first time. The altered wave is reflected at the internal termination of the reflection modulator 40, a short circuit suitable for radio frequency (ZL=0), and passes through the two setting elements 41, 42 again in order to then emerge as a reflected wave at the fourth port 39 of the directional coupler 34. The wave which is incident at the fourth port 39 and has been reflected by the reflection modulator 40 is added, in the directional coupler 34, to the crosstalk signal from the first port 36 to the second port 37 and the signal reflected by the antenna 35. If the amplitude and phase of the wave reflected by the reflection modulator have been set correctly, the spurious transmitted signal level at the input of the reception assembly 48 can thus be reduced. The phase and amplitude are set by the signal processor 46 using a D/A converter pair 45 and a low-pass filter pair 44.

Figure 5:
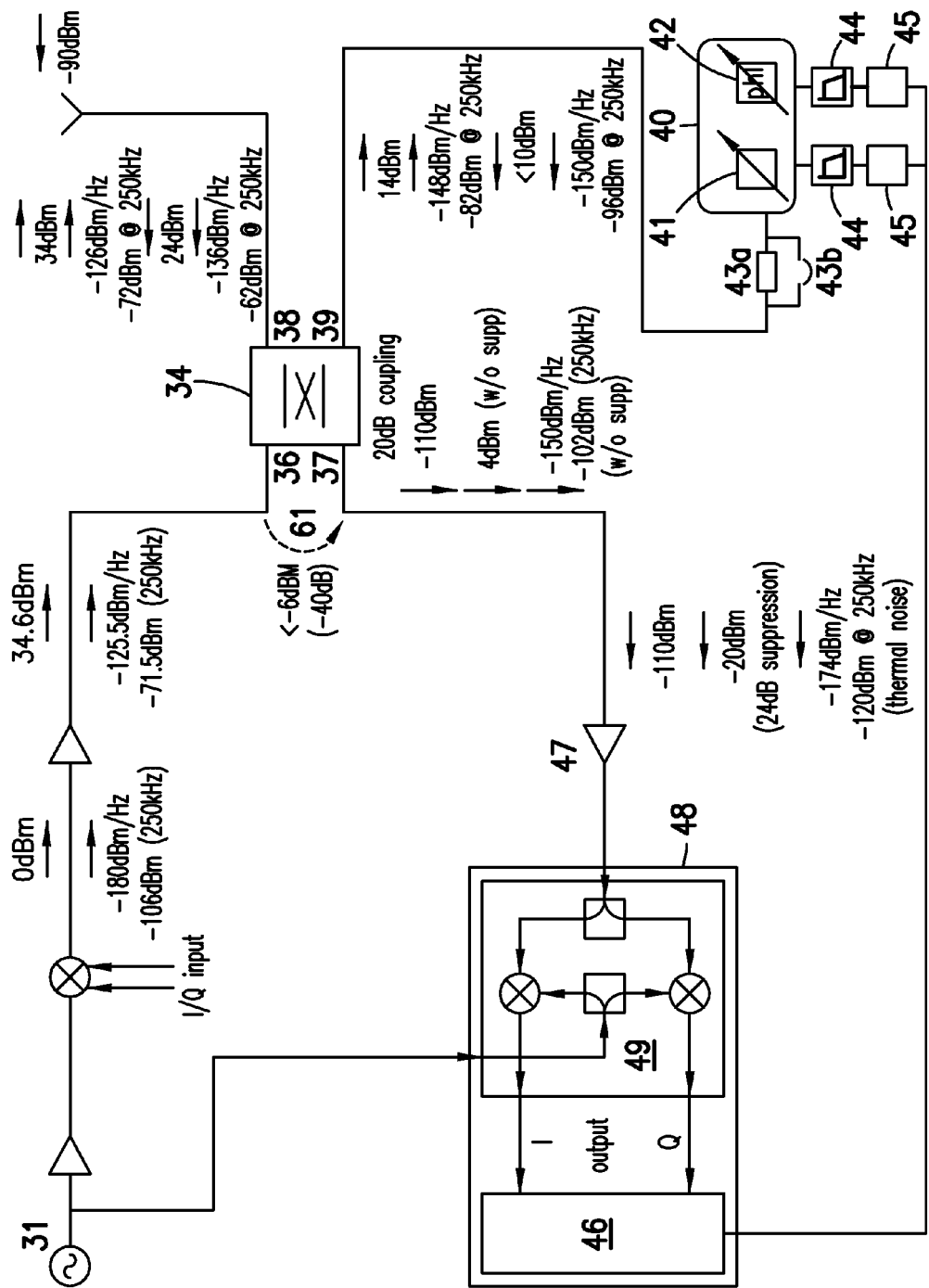
FIG. 5 shows this RFID writing/reading device with a reflection modulator downstream of the directional coupler, with level information.

In order to demonstrate the functionality of the device, the level diagram in FIG. 5 is intended to be explained below. The following level plan results on the basis of a typical application in the UHF band with a transmitted power of +34 dBm and the minimum reception level of −90 dBm for the tag signal as well as an allocated bandwidth of 250 kHz. The transmitted signal arrives at the first port 36 of the directional coupler 34 with 34.5 dBm and is emitted by the antenna with 34 dBm. The noise level of the transmitted signal is assumed to have a density of −125.5 dBm/Hz, that is to say is emitted with −126 dBm/Hz. The directional coupler 34 has a coupling loss of 20 dB and a passband loss of 0.5 dB. With a reflection loss of 10 dB, the antenna 35 is rather poorly matched to Zo, with the result that a high reflected power of 24 dBm with a noise power density of −136 dBm/Hz (−82 dBm for a bandwidth of 250 kHz) runs back to the third port 38 of the directional coupler 34. The received signal and the reflected signal from the antenna appear at the second port 37, after having been reduced by the coupling loss, with 4 dBm and −110 dBm, respectively, and a noise power density of −156 dBm/Hz (−102 dBm). It can be seen that it is not possible to detect the tag response without carrier signal suppression since a signal-to-noise ratio of −110−(−102)=−8 dB is produced. Furthermore, the level of 4 dBm at the second port 37 constitutes a problem for most reception amplifiers and results in the intermodulation known to a person skilled in the art.

According to at least one embodiment of the invention, a portion of the transmitted signal, which has been reduced by the coupling loss, is now output from the first port 36 to the fourth port 39, with the result that a copy of the transmitted signal with a level of 14 dBm and a noise power density of −146 dBm/Hz runs from the fourth port 39. This signal is now reflected in attenuated fashion by the fixed attenuator 43a and the variable attenuator 41 in the reflection modulator 40 in such a manner that the same carrier signal level as originates from the antenna (4 dBm) occurs, as far as possible, at the second port 37 of the directional coupler 34. In practice, there will always be a residual error here, with the result that complete suppression does not occur, not least because the reflected signal from the reflection modulator 40, the phase of which has been rotated by a variable phase shifter stage 42, will never be quite precisely in phase opposition (180°). In the example, it is assumed that the suppression is 24 dB (corresponds to an estimation error of, for example, 0.6 dB and 6°). A residual level of the carrier signal of approximately −20 dBm will therefore be applied to the second port 37 of the directional coupler 34. As a result of the fact that the carrier signal component reflected by the reflection modulator 40 and by the antenna contains exactly the same noise, the noise power density is also attenuated by 24 dB to −180 dBm/Hz. However, as a person skilled in the art knows, this level is below the thermal background noise of −174 dBm/Hz which cannot be undershot at room temperature. In other words, the full 24 dB suppression of the noise can no longer be achieved in this example and a further improvement in suppression would only reduce the carrier signal but no longer the noise power density. A spurious signal level of the carrier signal of −20 dBm and a noise power density of −174 dBm/Hz (−120 dBm) are thus obtained at the input of the reception amplifier 47, while the useful signal from the tag remains at −110 dBm. The signal-to-noise ratio is newly −110−(−120)=10 dB which enables good detection in the reception assembly 48.

A person skilled in the art can easily calculate other numerical examples, for example for altered matching of the antenna (reflection loss of 18 dB) or another directional coupler loss (14 dB). Advantageous dimensioning with a coupling loss of 15 dB results for antennas 35 which are used in RFID practice in stationary RFID writing/reading devices 30 and have a reflection loss of 15 dB or more. It should also be pointed out that the same calculation can also be carried out in the event of crosstalk of the carrier signal from the first port 36 to the second port 37, approximately 40 dB being able to be assumed as a practical value for the isolation from directional coupler components, as in the example. In the example, this switching path 61 is thus clearly the less critical path since it provides only approximately −6 dBm at the second port 37 of the directional coupler 34. It should also be mentioned that a certain amount of attenuation must be accorded to the reflection modulator 40, which attenuation technically cannot be undershot by said modulator. In FIG. 5, a value of 4 dB was assumed for the example, with the result that a maximum reflected signal of 10 dBm can run from the reflection modulator 40 to the fourth port 39.

If there is a high level of isolation and only a very small level of the reflected signal is required by the reflection modulator 40, it may be advantageous to connect a fixed attenuator 43a, which can be switched off using a bridging switch 43b and reduces the setting range of the variable attenuator 41, upstream of the reflection modulator 40.

Another function of the attenuator 43a may be to terminate the fourth port 39 with the characteristic impedance Zo as far as possible so that no reflection occurs. This would be useful for calibration since only the component from the antenna path occurs at the input of the reception assembly 48 in this case. For this case of operation, the attenuator 43a can be switched on/off using a bridging switch 43b. A value of 20 dB for the attenuation is easily sufficient for good matching.

Figure 6:
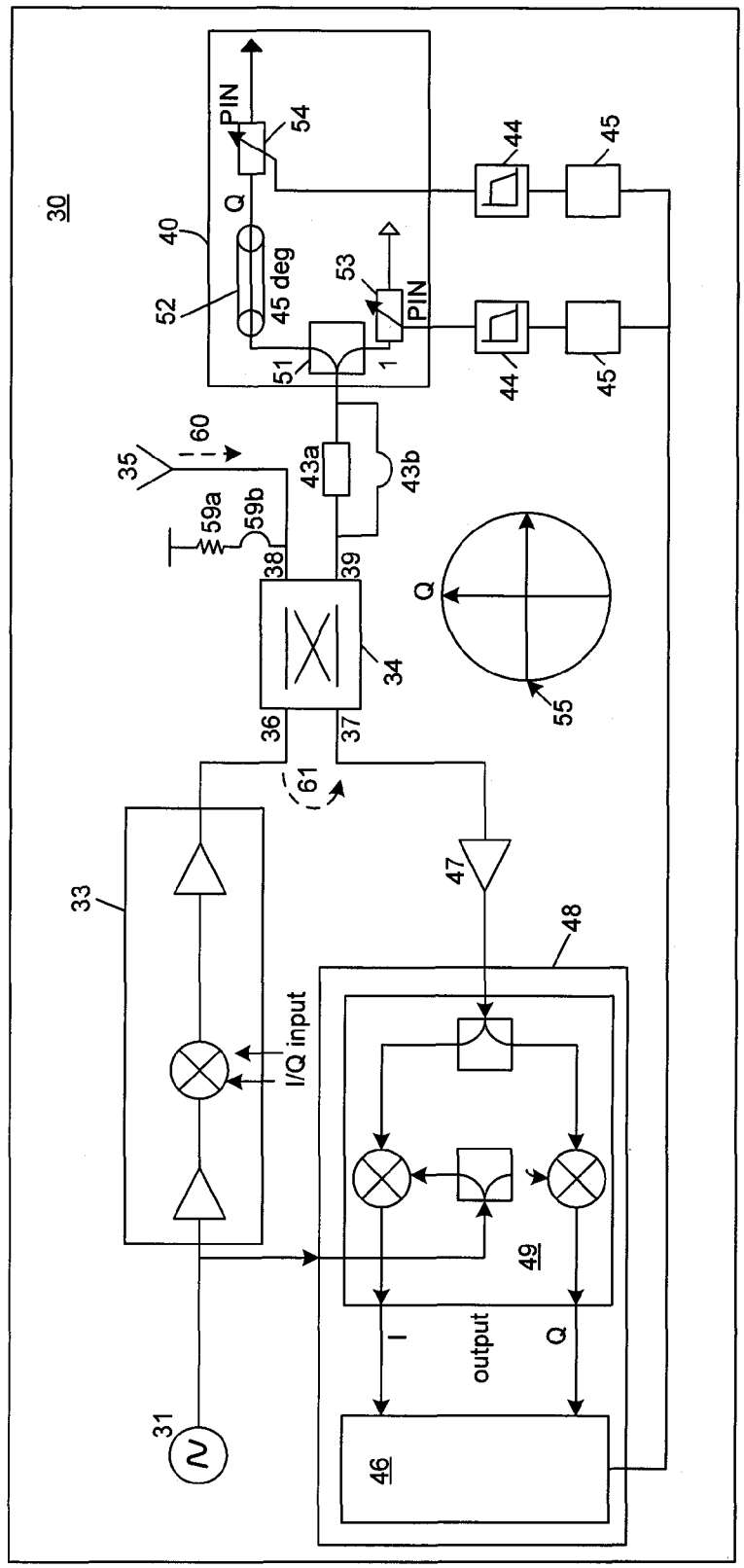
FIG. 6 shows a first embodiment of the reflection modulator according to an embodiment of the invention.
Figure 7:
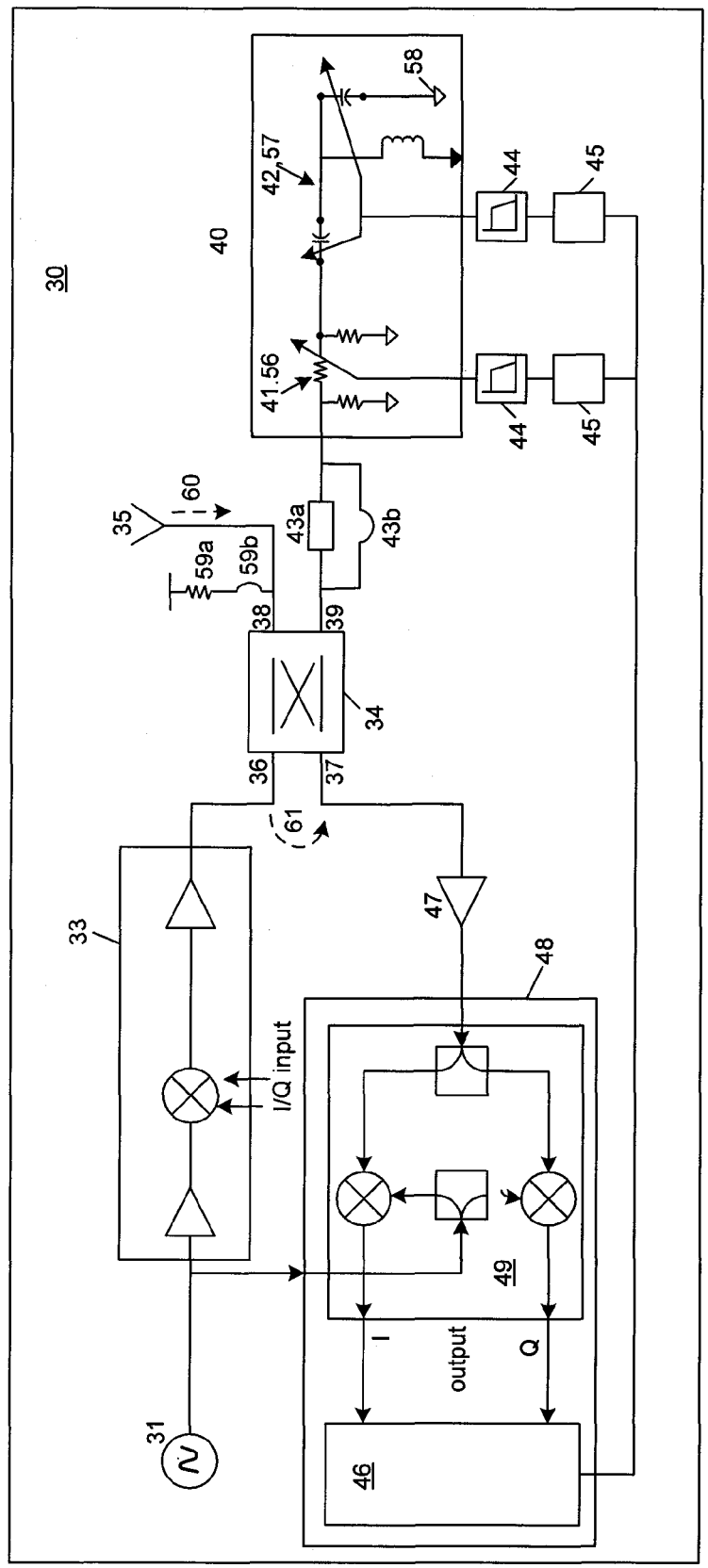
FIG. 7 shows another embodiment of the reflection modulator.

At least two possible implementations which are explained below using FIGS. 6 and 7 are advantageous according to at least one embodiment of the invention for the reflection modulator 40.

In a first refinement of the device, a power splitter 51 with the impedance Zo is installed at the fourth port 39 of the directional coupler 34, to which the reflection modulator 40 is connected, the task of the power splitter being to split the power into two identical components. One of the two identical signals is now passed, in one branch, to an electronically variable resistor 53 which is connected to ground. This variable resistor 53 preferably comprises a PIN diode (positive intrinsic negative diode) which, as is known to a person skilled in the art, can ideally be used as a linear, controllable resistor for RF applications. The resistance of the PIN diode 53 is known to depend on a current Id flowing through the diode. Since the forward voltage of the PIN diode 53 is approximately constant, this current Id can be simply generated with a variable voltage from the low-pass filter 44 via a fixed series resistor. The current Id should typically be set in the range from 10 µA to 10 mA, depending on the exact type of diode. It is thus possible to terminate the first output of the power splitter 51 with a resistor RL such that reflection on account of a mismatch occurs as long as RL is not equal to the characteristic impedance Zo. As is known to a person skilled in the art, reflection with the same phase as the incident wave results for RL>Zo and reflection in phase opposition (negative mathematical sign) results if RL<Zo. If RL=Zo, there is no reflection. This setting is suitable, for example, for calibration for the purpose of measuring the phase and amplitude of the signal to be compensated for. The second output signal from the power splitter 51 is likewise passed to a variable resistor 54, namely a PIN diode, via a delay line 52 having the characteristic impedance Zo and the electrical length 45° (corresponds to one eighth of the wavelength of the UHF frequency). This PIN diode 54 is driven by the second path D/A converter 45 and a low-pass filter 44. In contrast to the first output signal, the wave reflected at the PIN diode 54 is rotated again by 45°, that is to say by a total of 90°, by passing through the line 52 again. The two reflected waves are now added in the power splitter 51 which also functions as a power adder, the phases of the two signals having been rotated by 90° with respect to one another and the signals having different amplitudes depending on the setting of the PIN diodes 53, 54. As sketched in a diagram 55, it is thus possible (on account of the I/Q division) to cover the entire range from 0-1 according to the magnitude and from 0-360° according to the phase for the reflection factor, which is more than adequate in practice. In general, however, there will be no need to reach the limits since the crosstalk certainly has a certain amount of inherent attenuation and thus the demands on the ranges which must be able to be adjusted by the PIN diodes 53, 54 can be easily realized.

Another embodiment of the device described above involves using field effect transistors (FET), which are operated in the ohmic range, instead of the PIN diodes 53, 54. A person skilled in the art knows how to control the voltage of such an FET resistor. The resistance can also thus be set in the range RL>Zo and RL<Zo, depending on the control voltage.

In another refinement of the reflection modulator 40 in FIG. 4, the signal from the fourth port 39 of the directional coupler 34 is passed to an electronically variable attenuator 56, as depicted in FIG. 7. Such attenuators 56 for RF technology with the characteristic impedance Zo are known and preferably comprise PI or T elements with electronically controllable resistors which can be produced either from PIN diodes or FETs in a cost-effective manner in integrated form. They can be adjusted continuously in analog fashion or in fine steps in digital fashion. The latter case would dispense with one half of the D/A converters 45 and filters 44 (not depicted here). Downstream of the electronically variable attenuator 56, the signal is passed to an electronically variable phase shifter stage 57 which is likewise implemented with the impedance Zo and is terminated with a short circuit 58 to ground. The electronically variable phase shifter stage 57 comprises an LC filter, preferably in a T circuit, with the result that this stage represents a filter. Such filters have a phase response which depends on the number of components and the cut-off frequency. For further details, reference is made, by way of example, to the following citation: Low-Loss Analog Phase Shifter Using Varactor Diodes, A. Megej et al., Microwave & Optical Technology Letters, Vol. 19, No. 6, Dec. 20, 1998. Capacitance diodes may be used as variable elements. These are special RF diodes (also called varactors) which are driven in the reverse-bias range and whose junction capacitance is a function of the reverse voltage and is used as an electronically variable filter capacitance. Other electronically variable phase shifters 57 are disclosed in specialist literature and are based, for example, on novel ferrite materials or more complicated circuits with directional couplers which are not implemented here since they do not contribute to a cost-saving solution. This solution makes it possible to cover the entire range from 0-1 and 0-360° for the reflection factor 40.

Instead of LC filter combinations, it is also possible to use a filter structure with RC elements, the order of the filter having to be doubled for the same phase rotation. Idling could likewise be used instead of the short circuit 58 but it can be produced with less accuracy together with a PI structure of the filter.

Another embodiment of the invention allows the transmitted power of an RFID writing/reading device to be measured by appropriately setting the reflection modulator 40. If the reflection modulator 40 is set to full reflection, a proportional part of the transmitted power, namely reduced by the coupling loss of the directional coupler 34, is reflected to the fourth port 39 of the directional coupler 34 and is provided at the second port 37 of the reception assembly 48 for the purpose of measurement. The advantage is that a second directional coupler is not required for this task. In order to achieve this state of full reflection, only the two PIN diodes 53, 54 in the variant in FIG. 6 must be made to have a very low impedance and the fixed attenuator 43a which is used if need be must be bridged.

In at least one embodiment, the invention also comprises a method for instantaneously setting carrier suppression and for controlling the latter. The simplest method measures the DC voltages which occur at reception inputs I and Q of the signal processor 46 and a known control algorithm controls these voltages to a minimum, theoretically 0 volts, if the offset voltages which occur in practical circuits are negligibly small at the output of the RX converter 49. If this does not apply, these offset voltages may be measured in a preceding measurement period without a transmitted signal and may be added to the control aim.

In order to instantaneously suppress the spurious carrier signal 21 (cf. FIG. 3), the following procedure can be adopted according to at least one embodiment of the invention. While the transmitter assembly 33 is activated and supplies power, the reflection modulator 40 is set to the value Zo for a particular measurement time T1, the setting variables in the signal processor 46 being known. The full reflected carrier signal 21 to be compensated for now arrives at the reception assembly and the amplitude and phase of said signal can be measured. In order to determine the amplitude and phase of the signal path of the signal which is reflected by the reflection modulator 40 and is used later for compensation, the switch 59b is used to change over the output of the transmission assembly 33 to a terminating resistor 59a with the impedance Zo for a particular measurement time T2. At the same time, the reflection modulator 40 is set to full reflection, the setting variables in the signal processor 46 being known. The full carrier signal 21 which has been reflected by the reflection modulator 40 and has been reduced by the coupling loss now arrives at the reception assembly 48 and the amplitude and phase of said signal can likewise be detected. The two variables can now be used to determine the correction, in terms of amplitude and phase, for theoretically instantaneous suppression of the carrier signal 21. The correction values are converted, in the signal processor 46, into setting values for the reflection modulator 40 or are alternatively read from previously measured settings which are stored in the form of a table.

In this case, it should be taken into account that the selected types of embodiment for correcting the amplitude and phase in the reflection modulator 40 at least partially have non-linear characteristic curves. According to at least one embodiment of the invention, such non-linear characteristic curves can be metrologically determined in advance and can be linearized by means of further conversion or table conversion in the signal processor 46. Linearized characteristic curves have advantages in terms of stability and control speed, in particular in control systems.

One particular embodiment of the invention enables DC-free operation of the reception assembly 48 without additional measuring devices for offset voltages. This is achieved by modulating or adding a weak auxiliary signal 22 onto or to the carrier signal 21 (FIG. 3) which is used to read electronic tags. The spectrum and level of the auxiliary signal 22 are designed in such a manner that said signal does not interfere with useful operation in electronic tags.

In one simple embodiment, for example, this auxiliary signal may be a sinusoidal signal of the frequency fd at the band limit, which signal amplitude-modulates the carrier signal 21 only weakly, for example 40 dB below the level of the carrier signal 21. However, the auxiliary signal 22 is chosen to be much stronger than the response signals 24 reflected by electronic tags such that the reception assembly 48 does not have to operate at the limit of sensitivity in order to determine the compensation signal.

Figure 2B:
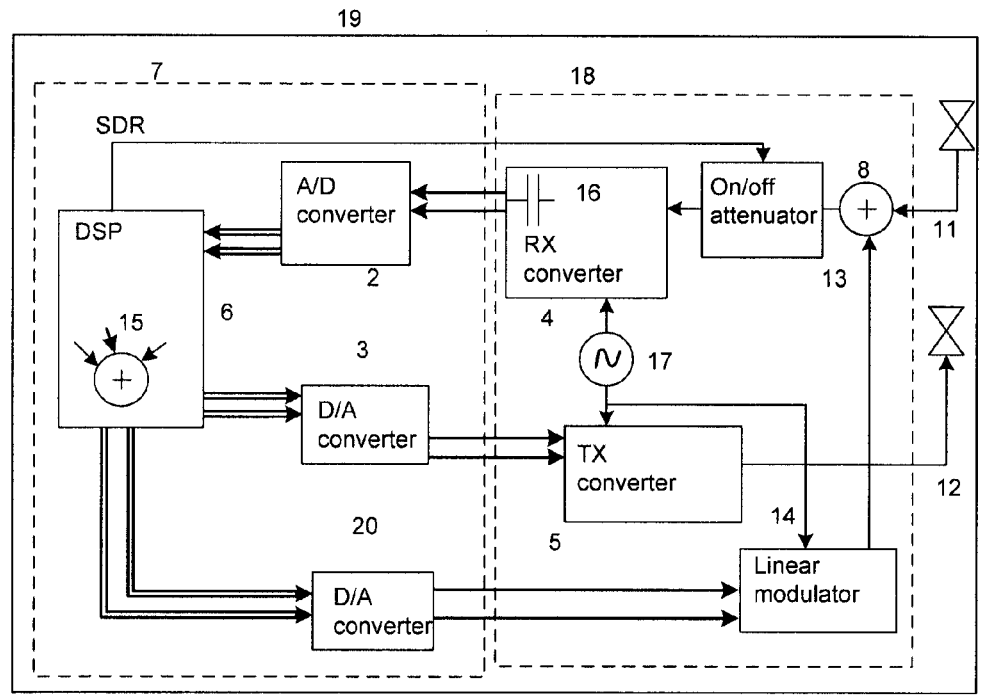
FIG. 2b shows another conventional device for compensating for a coupling signal from a transmitter antenna to a receiver antenna.
Figure 3:
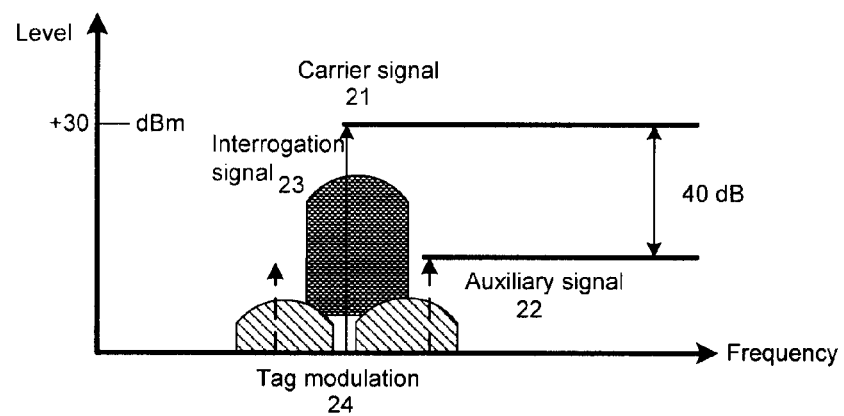
FIG. 3 shows a spectrum with a transmitted signal from the RFID writing/reading device, a response signal from electronic tags and an auxiliary signal.

As an exemplary embodiment, it is possible to consider the level plan from FIG. 3 in which the auxiliary signal 22 is 40 dB weaker than the carrier signal 21. The compensation signal is again a copy of the carrier signal 21 provided with the auxiliary signal 22, said copy having been processed in terms of the amplitude and phase angle.

According to at least one embodiment of the invention, the auxiliary signal 22 appears, in the reception assembly 48 downstream of the RX converter 49, in the form of an AC signal of the frequency fd and not in the form of a DC voltage. This has the advantage that the I and Q outputs of the RX converter 49 can be operated in AC-voltage-coupled mode (AC) as desired. It is thus a simple matter to use a high-pass filter (not depicted here) to remove DC offsets which occur in the mixer stages in the RX converter 49 and naturally that component of the carrier signal 21 itself which limits the dynamic range.

The embodiment described thus makes it possible to instantaneously improve isolation even before the first interrogated electronic tags reflect their weak response signal. After this instantaneous compensation, it is possible to receive signals with the full reception sensitivity without the reception amplifier 47 being overdriven. The injected carrier signal 21 which has now been instantaneously effectively compensated for still remains reduced at a harmless level below −10 to −20 dBm, for example. According to at least one embodiment of the invention, the noise component of the carrier signal was also simultaneously suppressed in the transmitted signal and the reception sensitivity was increased thereby. In practice, results close to the value which is limiting anyway as a result of the noise figure of the reception amplifier 47 are achieved, for example −115 dBm with a bandwidth of 250 kHz.

Since electronic tags or RFID writing/reading devices can move during interrogation, the injected spurious signal temporally varies in relation to the carrier signal 21. It is necessary to continuously measure and track interference suppression during operation and this is easily possible with the aid of the auxiliary carrier 22. An aim of control is to control to the minimum of the AC voltage amplitudes at the I and Q inputs of the signal processor 46. The frequency is preferably selected with the aid of a fast Fourier transformation or digital bandpass filters. Owing to the fact that the receiver can operate in the correct signal range following the instantaneous initial compensation, to be precise with considerably less intermodulation than in the uncorrected case, this control loop can now be achieved in an improved manner.

Reference Symbols
1 Baseband part
2 Analog/digital converter
3 Digital/analog converter
4 RX converter
5 TX converter
6 Digital signal processor
7 Directional coupler
8 Addition stage
9 Digital/analog converter
10 Vector modulator
11 Transmission antenna
12 Reception antenna
13 Attenuator
14 Digital addition stage
15 Linear modulator
16 AC coupling
17 RF oscillator
18 RF part
19 Writing/reading device
20 D/A converter
21 Carrier signal
22 Auxiliary signal
23 Interrogation signal
24 Tag signal
25 Transmission amplifier
26 Reception amplifier
27 Crosstalk from transmission amplifier to reception amplifier
28 Crosstalk from transmission antenna to reception antenna
29 Crosstalk by virtue of reflection path
30 RFID writing/reading device
31 RF oscillator
33 Transmission assembly
34 Directional coupler
35 Transmission/reception antenna
36 First port of the directional coupler
37 Second port of the directional coupler
38 Third port of the directional coupler
39 Fourth port of the directional coupler
40 Reflection modulator
41 Setting element for the amplitude of the reflected signals 42 Setting element for the phase rotation of the reflected signals
43a Fixed attenuator
43b First switch
44 Low-pass filter
45 Digital/analog converter
46 Digital signal processor
47 Reception amplifier
48 Reception assembly
49 RX converter with I/Q outputs
51 Power splitter, power adder
52 Delay line
53 First electronically variable resistor
54 Second electronically variable resistor
55 I/Q representation of the reflected signal
56 Electronically variable attenuator
57 Electronically variable phase shifter
58 Radio-frequency short circuit
59a Terminating resistor
59b Second switch
60 Reflection antenna
61 Isolation between transmitter and receiver

The invention claimed is:

1. A device for operating an RFID writing/reading device with transmitted signal suppression, the device comprising:
the RFID writing/reading device including a transmitter, a receiver with a signal processor, a directional coupler with a first, a second, a third and a fourth port, and an antenna,
a reflection modulator connected to the fourth port of the directional coupler, the reflection modulator including a first setting element and a second setting element,
wherein the reflection modulator is configured to reflect a copy of a transmitted signal from the RFID writing/reading device, the amplitude and phase of which copy have been weighted, to the directional coupler, and
wherein the directional coupler is configured to add the weighted copy of the transmitted signal to a received signal from the antenna;
wherein the reflection modulator comprises a signal splitter, a delay line of the electrical length 45° and a first and a second electronically variable resistor as the terminating load, and
wherein the first and second electronically variable resistors are each implemented using at least one PIN diode (positive intrinsic negative diode) configured to be operated in the forward-bias range by a direct current.

2. The device as claimed in claim 1, wherein the reflection modulator is in the form of a passive vector modulator comprising an electronically variable attenuator and an electronically variable phase shifter.

3. The device as claimed in claim 1, wherein a fixed attenuator which can be switched on is connected upstream of the reflection modulator.

4. The device as claimed in claim 1, wherein the first and second electronically variable resistors are each implemented using at least one field effect transistor which can be operated in the ohmic characteristic curve region.

5. The device as claimed in claim 2, wherein the electronically variable attenuator comprises a Pl-shaped or T-shaped resistor network, at least one resistor in this resistor network being electronically variable.

6. The device as claimed in claim 2, wherein the electronically variable phase shifter comprises an LC filter circuit, at least one capacitance being formed by a capacitance diode, to which a DC voltage is applied in the reverse-bias range and whose output is terminated using an RF short circuit.

7. The device as claimed in claim 2, wherein the electronically variable phase shifter comprises an RC filter circuit, at least one capacitance being formed by a capacitance diode, to which a DC voltage is applied in the reverse-bias range, or the resistors being in the form of PIN diodes through which a direct current flows in the forward-bias range, and the output of the RC filter circuit leading to an RF short circuit.

8. The device as claimed in claim 1, wherein the reflection modulator is configured to be set to freedom from reflection for a signal running into the reflection modulator, with the result that only the signal components which originate from crosstalk or from the antenna occur at the second port and can be supplied to the signal processor for measurement.

9. The device as claimed in claim 1, wherein the third port is connected to the antenna and can be changed over to a reflection-free terminating resistor, with the result that only the signal components which originate from the reflection modulator occur at the second port and can be supplied to the signal processor for measurement.

10. The device as claimed in claim 3, wherein the fixed attenuator can be bridged and the reflection modulator can be set to full reflection for the signal running into the reflection modulator.

11. A method for operating an RFID writing/reading device with transmitted signal suppression, the method comprising:
providing the RFID writing/reading device comprising a transmitter, a receiver including a signal processor, a directional coupler including a first, a second, a third and a fourth port, and an antenna,
providing a reflection modulator at the fourth port of the directional coupler, the reflection modulator including a first and a second setting element,
setting a reflection factor of the reflection modulator,
reflecting a copy of a transmitted signal from the RFID writing/reading device, the amplitude and phase of which copy have been weighted, to the directional coupler, and
suppressing undesirable transmitted signal components at the second port of the directional coupler which leads to the receiver with said copy of the transmitted signal,
wherein the reflection modulator is set on the basis of an amplitude and phase measurement on a transmitted signal, which transmitted signal has an auxiliary signal with a frequency offset fd with respect to a carrier signal of the RFID writing/reading device impressed on it for the purpose of DC-voltage-free processing in the receiver downstream of the RX converter, and
wherein suppressing undesirable components is achieved with the aid of a closed control loop, an AC voltage component of the frequency fd at a first and a second output (I/Q outputs) of an RX converter being read into the signal processor of the RFID writing/reading device as a measure of the suppression achieved, and this AC voltage component being controlled to the target value of 0 volts.

12. The method as claimed in claim 11, wherein suppressing undesirable components is achieved with the aid of a closed control loop, a DC voltage component at a first and a second output (I/Q outputs) of an RX converter being read into the signal processor of the RFID writing/reading device as a measure of intended suppression, and this DC voltage component being controlled to the target value of 0 volts.

13. The method as claimed in claim 11, wherein the carrier signal is amplitude-modulated with a small swing or is added to a sideband signal.

14. The method as claimed in claim 11 wherein the both the transmitted signal and the copy of the transmitted signal, the amplitude and phase of which copy have been weighted, are individually switched on and off by the reflection modulator in order to be able to individually detect the amplitude and phase variables of a coupling signal and a reflected signal in the signal processor in order to use said variables to calculate a setting of the reflection modulator for immediately effective suppression.

15. The method as claimed in claim 11, wherein a nonlinearity in a characteristic curve of the setting element of the reflection modulator is linearized by a conversion in the signal processor.

16. The method as claimed in claim 11, wherein after immediately setting a first suppression, an improvement is carried out by adjustment with the aid of control algorithms in the signal processor.

17. The method as claimed in claim 11 wherein as a result of the reflection modulator being set to full reflection, the reflected signal power becomes available at the second port in a manner proportional to the transmitted power and is supplied to the receiver in order to determine the transmitted power.

18. A device for operating an RFID writing/reading device with transmitted signal suppression, the device comprising:
the RFID writing/reading device including a transmitter, a receiver with a signal processor, a directional coupler with a first, a second, a third and a fourth port, and an antenna,
a reflection modulator connected to the fourth port of the directional coupler, the reflection modulator including a first setting element and a second setting element,
wherein the reflection modulator is configured to reflect a copy of a transmitted signal from the RFID writing/reading device, the amplitude and phase of which copy have been weighted, to the directional coupler, and
wherein the directional coupler is configured to add the weighted copy of the transmitted signal to a received signal from the antenna;
wherein the reflection modulator is in the form of a passive vector modulator comprising an electronically variable attenuator and an electronically variable phase shifter; and,
wherein the electronically variable attenuator comprises a PI-shaped or T-shaped resistor network, at least one resistor in this resistor network being electronically variable.

19. A device for operating an RFID writing/reading device with transmitted signal suppression, the device comprising:
the RFID writing/reading device including a transmitter, a receiver with a signal processor, a directional coupler with a first, a second, a third and a fourth port, and an antenna,
a reflection modulator connected to the fourth port of the directional coupler, the reflection modulator including a first setting element and a second setting element,
wherein the reflection modulator is configured to reflect a copy of a transmitted signal from the RFID writing/reading device, the amplitude and phase of which copy have been weighted, to the directional coupler, and
wherein the directional coupler is configured to add the weighted copy of the transmitted signal to a received signal from the antenna;
wherein the reflection modulator is in the form of a passive vector modulator comprising an electronically variable attenuator and an electronically variable phase shifter; and,
wherein the electronically variable phase shifter comprises an LC filter circuit, at least one capacitance being formed by a capacitance diode, to which a DC voltage is applied in the reverse-bias range and whose output is terminated using an RF short circuit.

20. A device for operating an RFID writing/reading device with transmitted signal suppression, the device comprising:
the RFID writing/reading device including a transmitter, a receiver with a signal processor, a directional coupler with a first, a second, a third and a fourth port, and an antenna,
a reflection modulator connected to the fourth port of the directional coupler, the reflection modulator including a first setting element and a second setting element,
wherein the reflection modulator is configured to reflect a copy of a transmitted signal from the RFID writing/reading device, the amplitude and phase of which copy have been weighted, to the directional coupler, and
wherein the directional coupler is configured to add the weighted copy of the transmitted signal to a received signal from the antenna;
wherein the reflection modulator is in the form of a passive vector modulator comprising an electronically variable attenuator and an electronically variable phase shifter; and,
wherein the electronically variable phase shifter comprises an RC filter circuit, at least one capacitance being formed by a capacitance diode, to which a DC voltage is applied in the reverse-bias range, or the resistors being in the form of PIN diodes through which a direct current flows in the forward-bias range, and the output of the RC filter circuit leading to an RF short circuit.

* * * * *